Feb. 24, 1942. V. JERECZEK 2,273,963
SWITCHING DEVICE, ESPECIALLY FOR MACHINE TOOLS
Filed July 8, 1937

Inventor:
V. Jereczek by:
Glascock Downing & Seebold
Attorneys.

Patented Feb. 24, 1942

2,273,963

UNITED STATES PATENT OFFICE 2,273,963

SWITCHING DEVICE, ESPECIALLY FOR MACHINE TOOLS

Viktor Jereczek, Weissensee, near Berlin, Germany

Application July 8, 1937, Serial No. 152,660
In Germany July 17, 1936

2 Claims. (Cl. 90—21)

My invention relates to milling machines, especially to a device for automatically throwing into, and out of, gear a feed drive in dependency of a tool drive.

It is with milling machines, known to derive the feed of the workpiece carrier not from the tool drive, but to employ an independent drive for that feed. This arrangement presents essential advantages, it is true, but there exists the danger that tool fractures or other disturbances may arise if from any reason the drive of the milling cutter spindle is interrupted and not instantaneously also the independent feed drive of the workpiece carrier is thrown out of gear.

The object of the present invention is to overcome the just mentioned drawback. I attain this object by means of an extremely simple, as well as reliably operating switching device, the gist of which resides therein that with one of the drives a centrifugal switch is connected which is so designed that it causes a throwing-into-gear movement or a switching-on movement when the number of revolutions of the milling cutter spindle is a certain predetermined one, and causes a throwing-out-of gear movement or a switching-off movement when the number of revolutions of this spindle becomes less than that certain predetermined one.

The invention may be carried out for instance, in this way that a rotating member of one of the drives is provided with a switching member so arranged as to be able to be moved by centrifugal action and being, besides, subjected to the action of springs, weights or the like in such a measure that it performs a switching movement in a direction in which the other drive is thrown into gear, or is maintained in operation respectively, only if the number of revolutions of the first-mentioned drive is the certain predetermined one.

The arrangement is preferably so that at a disk or the like rotated by the drive of a milling cutter spindle a plurality of balls is held in a guide-groove in such a manner that the balls are subject to centrifugal action and shift, in consequence thereof, a switching member subject to the counter-action of springs and acting, in turn, on the drive of the feed of the workpiece, the arrangement being such that said switching member is shifted in the opposite direction when the action of the centrifugal force decreases.

Figure 4:
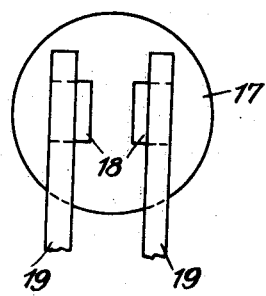
Figure 1:
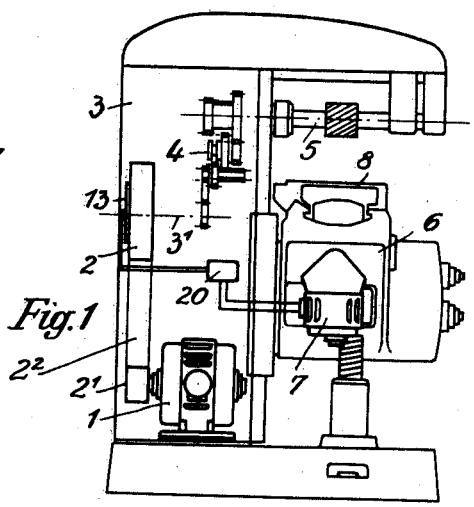
Figure 2:
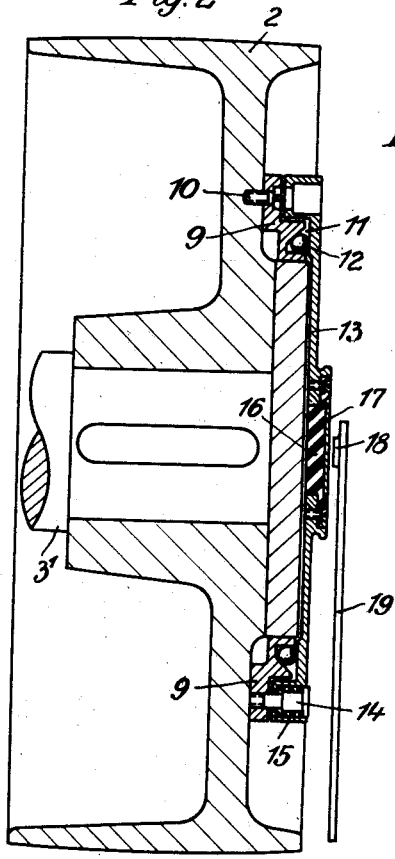
Figure 3:
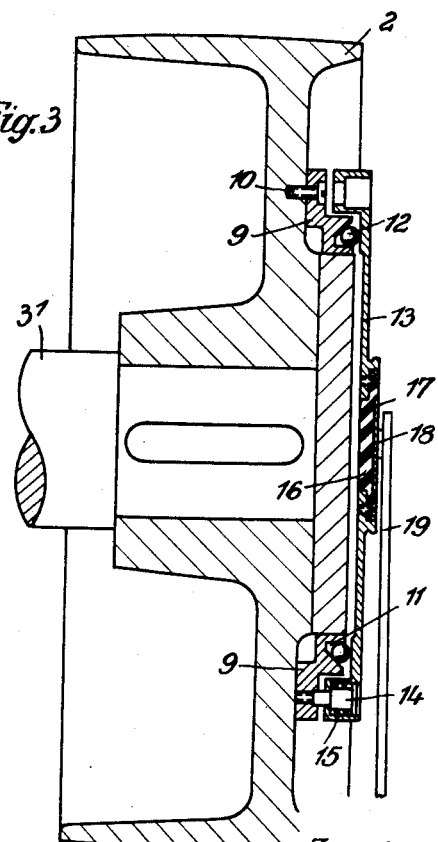

The invention is illustrated diagrammatically and by way of example on the accompanying drawing on which Figure 1 is a side-view of a milling machine equipped with the arrangement and combination of parts constituting the invention. Figures 2 and 3 are axial sections through a belt pulley, to which said parts are attached, these parts being shown in two different positions and these figures being drawn to a considerably enlarged scale relatively to Fig. 1 in which the belt pulley is located in the middle portion of its left-hand half. Figure 4 shows some members located on the right-hand side of Figs. 2 and 3, in the centre portion thereof, and being seen from the right to the left of these figures.

On the drawing, 1 (Fig. 1) denotes the main motor which drives a large pulley 2 by the intermediary of a small pulley $2^1$ and a belt $2^2$. The pulley 2 is affixed to a shaft $3^1$ (indicated in Fig. 1 merely by a dotted line) supported in the frame 3 of the milling machine. The rotary motion of said shaft is transmitted by means of a variable speed-gear 4 to the milling spindle 5. Below this latter is the milling table 8 which is reciprocated by means of a separate motor 7 secured to the transverse bed 6 of the machine.

To the free face of the pulley 2 is affixed by means of screws 10 a ring 9 having in its free face an annular groove 11 of about angular or conical transverse section (Figs. 2 and 3) and in said groove is located a plurality of balls 12 retained in the groove by means of a circular disk 13 affixed to the pulley by means of screws 14 by the intermediary of helical compression springs 15 surrounding the body portion of said screws and permitting a certain slight axial motion of said disk 13 (see Figs. 2 and 3), relatively to the ring 9 with the balls 12 in the groove 11. The springs 15 bear with their outer ends on the heads of the screws 14 and with their inner ends on an inwardly directed flange of the disk 13, as distinctly visible in the portions concerned of the lower half of each of the Figs. 2 and 3.

In the centre portion of the disk 13 is a disk 16 of an insulating material to which is affixed a contact plate 17. Opposite the centre of this plate is a contact piece 18 secured to a bow 19. The contact plate 17 and the bow 19 with the contact 18 form parts of a circuit into which a switch 20 (Fig. 1) is inserted. This switch pertains to the circuit supplying the motor 7 with current. Instead of only one bow 19 with a contact 18 two such bows bearing each a contact 18 may be provided, as shown in Fig. 4.

The manner of operation of the device is as follows:

At a certain predetermined number of revolutions of the pulley 2 of the milling spindle drive the disk 13 is shifted axially so as to cause the contact members 17 and 18 to contact with one another. If the number of revolutions of said spindle becomes lower than said certain predetermined one the disk 13 will be moved toward the pulley 2 by the springs 15, in consequence whereof the contact between the members 17 and 18 will be broken, whereby the switch 20 will be caused to interrupt the supply of current to the motor 7. Feeding the motor 7 again with current is possible only when the number of revolutions of the milling spindle has again become the certain predetermined one, that is to say, when the pulley 2 rotates with the corresponding number of revolutions at which the members 17 and 18 are in contact with one another.

I claim:

1. In a milling machine having a main motor for driving a milling cutter spindle and a second motor for driving a reciprocable machine table, in combination, a rotating member driven by said main motor, a gear drive for said milling cutter spindle, and receiving motion from said rotating member, and means on said rotating member for automatically closing the circuit of the second motor when the speed of said rotating member becomes a predetermined value.

2. In a milling machine having a main motor for driving a milling cutter spindle and a second motor for driving a reciprocable machine table, in combination, a rotating member driven by said main motor, a gear drive for said milling cutter spindle, and receiving motion from said rotating member, and means on said rotating member for automatically closing the circuit of the second motor when the speed of said rotating member becomes a predetermined value, and for automatically interrupting the circuit of the second motor when the speed of said rotating member becomes lower than the predetermined value.

VIKTOR JERECZEK.